(12) United States Patent
Begeja et al.

(10) Patent No.: US 6,453,043 B1
(45) Date of Patent: *Sep. 17, 2002

(54) FLASH-CUT OF SPEECH PROCESSING FEATURES IN A TELEPHONE CALL

(75) Inventors: Lee Begeja, Gillette; Carroll W. Creswell, Basking Ridge; Daniel Selig Furman; Michael Joseph Haller, both of Summit; John A. McMaster, Basking Ridge, all of NJ (US); John C. Songrady, Washington Crossing, PA (US); Thomas Wasilewski, Marlboro; Donald Joseph Youtkus, Scotch Plains, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/222,802

(22) Filed: Dec. 30, 1998

Related U.S. Application Data

(63) Continuation of application No. 08/767,359, filed on Dec. 18, 1996, now Pat. No. 6,021,194.

(51) Int. Cl.7 .................................................. H04M 9/00
(52) U.S. Cl. ................... 379/406.03; 379/400; 381/123
(58) Field of Search ................................. 379/387, 390, 379/391, 406, 410, 400, 201, 207, 211, 215, 216, 265, 266, 355, 388, 395, 414, 409, 387.01, 390.01, 388.01, 406.16; 704/225, 233, 243, 200, 207, 251, 226, 502; 455/63, 563, 564, 570; 381/94.7, 61, 123

(56) References Cited

U.S. PATENT DOCUMENTS

| | | | |
|---|---|---|---|
| 5,001,701 A | 3/1991 | Gay | 379/410 |
| 5,123,048 A | 6/1992 | Miyamae et al. | 381/41 |
| 5,195,132 A | 3/1993 | Bowker et al. | 379/410 |
| 5,313,498 A | 5/1994 | Sano | 379/410 |
| 5,448,631 A | 9/1995 | Cain | 379/201 |
| 5,485,515 A | 1/1996 | Allen et al. | 379/391 |
| 5,590,241 A | 12/1996 | Park et al. | 704/227 |
| 6,021,194 A * | 2/2000 | Begeja et al. | 379/410 |

FOREIGN PATENT DOCUMENTS

| | | |
|---|---|---|
| EP | 0 507 505 A2 | 10/1992 |
| EP | 0 539 017 A2 | 4/1993 |

OTHER PUBLICATIONS

European Search Report, App. No. EP 97 10 3876, Sep. 15, 1999.

* cited by examiner

*Primary Examiner*—Wing Chan
(74) *Attorney, Agent, or Firm*—Kenyon & Kenyon

(57) ABSTRACT

A speech processor uses at least two speech processing features to enhance the quality of speech signals received by a user during a telephone call. The speech processing features are applied to the speech signals. However, the user only hears speech signals affected by one speech processing feature until both features have fully converged or ramped-up, and the two features are no longer interfering with each other. At that point, a "flash-cut" of the second speech processing feature is activated. The flash-cut instantaneously switches to speech signals affected by both features. This quick transition makes the speech processing features more noticeable to the user, and the user is not subjected to the period where the features interfere. Further, an optional audio indicator is generated before implementing the flash-cut, so the user is alerted to the flash-cut, and the speech processing features are even more noticeable.

23 Claims, 2 Drawing Sheets

FLASH-CUT OF SPEECH PROCESSING FEATURES IN A TELEPHONE CALL

CROSS-REFERENCES TO RELATED APPLICATIONS

This application is a continuation of and claims priority to U.S. patent application Ser. No. 08/767,359, filed Dec. 18, 1996 now U.S. Pat. No. 6,021,194.

BACKGROUND OF THE INVENTION

The present invention relates to enhancing the quality of speech in a telephone call and, more particularly, to a method and apparatus that provides a flash-cut of speech processing features in a telephone call.

It is well-known in the telecommunication art to apply speech processing features in a telephone network in order to enhance the quality of the speech signals. Some features provide virtually their full intended effect immediately upon activation. These features are referred to as "non-adaptive" and include, for example, pre-emphasis filters and equalizers. Other features, however, gradually and smoothly apply their effect, i.e., "ramp-up," following activation. These features are referred to as "adaptive" and include, for example, automatic gain control, background noise compensation, noise reduction and echo cancellation.

It is known that more than one speech processing feature can be applied in a telephone network. For example, U.S. Pat. No. 5,195,132 issued to Bowker et al. on Mar. 16, 1993 discloses utilizing both echo cancellation and digital filtering to enhance speech signal quality. However, a problem which heretofore has not been recognized in the telecommunication art arises when more than one speech processing feature is applied to a telephone network, especially with telephone networks using echo cancelers. This problem can be seen in FIG. 1 which shows a graph of a particular telephone call beginning at time $t_0$. Curve 8 represents echo cancellation on the network. As is known in the art, echo cancellation requires time following the start of a call to fully "ramp-up" or converge, and in FIG. 1 convergence of curve 8 occurs at time $t_1$. Curve 9 represents another adaptive process such as background noise compensation which takes a duration of time $t_2$ to ramp-up. A problem ensues throughout the duration of time $t_1-t_0$ when the ramp-up of both processes overlap. During this period the processes interfere with each other and the call quality is severely degraded. Therefore, there is a need for a technique for providing multiple speech processing features to a telephone network without having the call quality initially degraded.

Another problem with the techniques disclosed in the prior art for applying speech processing features to a telephone network involves the user's perception of the effect of these features. In the telecommunication industry, speech processing features have always been provided at the start of the call and the motivation of telecommunication system designers has always been to reduce the ramp-up time of the features so that the transition to full effectiveness of the features is least noticeable by the customer. For example, U.S. Pat. No. 5,001,701 issued to Gay on Mar. 19, 1991 discloses using real-time allocation among subbands to achieve faster overall convergence of echo cancellation. However, we have found that if the speech processing features are provided right from the start of the call, with quick ramp-up time, users may not attribute the higher quality call to the presence of the speech processing features. Therefore, there is a need to alert the user that speech processing features that enhance the speech signal quality are being applied to a particular call.

SUMMARY OF THE INVENTION

In accordance with one embodiment of the present invention, two speech processing features are applied to the speech signals of a telephone call. However, the user only hears speech signals affected by one speech processing feature until both features have fully converged or ramped-up, and the two features are no longer interfering with each other. At that point, a "flash-cut" of the second speech processing feature is activated. The flash-cut instantaneously switches to speech signals affected by both features. This quick transition makes the speech processing features more noticeable to the user, and the user is not subjected to the period where the features interfere.

In another embodiment of the present invention, two speech processing features are applied to the speech signals of a telephone call. However, the user hears speech signals not affected by either speech processing feature until both features have fully converged or ramped-up, and the two features are no longer interfering with each other. At that point, a "flash-cut"of both speech processing features is activated.

In another embodiment of the present invention, an audio indicator is generated before implementing the flash-cut, so the user is alerted to the flash-cut, and the speech processing features are even more noticeable.

The above-described features of the present invention are not found in the prior art because the conventional wisdom in the telecommunication art is to minimize as much as possible the intrusiveness and noticeability to the user of the speech processing features. In contrast, in the present invention the flash cut and audio indicator increases the intrusiveness and noticeability of the speech processing features.

DETAILED DESCRIPTION OF THE INVENTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example, the functions of processors presented in FIG. 2 may be provided by a single shared processor. (Use of the term "processor"should not be construed to refer exclusively to hardware capable of executing software.)

Illustrative embodiments may comprise digital signal processor (DSP) hardware, such as the Lucent Technologies DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

Figure 2:
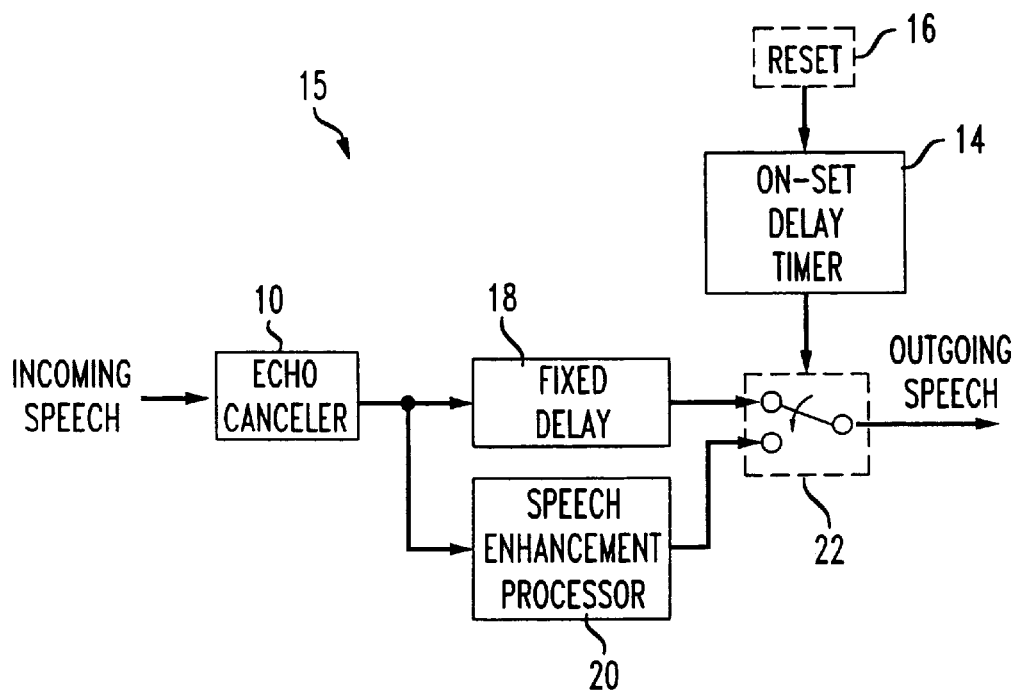
FIG. 2 is a block diagram of one embodiment of the speech processor of the present invention.

Referring in detail to the drawings, wherein like parts are designated by like reference numerals throughout, there is illustrated in FIG. 2 a block diagram of a speech processor 15 in accordance with an embodiment of the present invention. In FIG. 2, "incoming speech" refers to the speech signal prior to processing while "outgoing speech" refers to the speech signal following processing.

The speech processor 15 includes an echo canceler 10 which performs echo cancellation on the incoming speech. The input of the echo canceler 10 is coupled to the incoming speech path and the output is coupled to the input of both a fixed delay unit 18 and a speech enhancement processor 20. The speech enhancement processor 20 implements one or more speech processing algorithms for processing incoming speech. In one embodiment, the speech enhancement processor 20 performs background noise compensation on the incoming speech. The fixed delay unit 18 delays the speech path by an amount equal to the overall delay introduced by the speech enhancement processor 20. The output of the fixed delay unit 18 and the speech enhancement processor 20 is selectively coupled through a switch 22 to the outgoing speech path.

The speech processor 15 further includes a delay timer 14. The delay timer 14 is coupled to the switch 22 and includes a reset input 16. The delay timer 14 can either configure the switch 22 so that the fixed delay unit 18 is coupled to the outgoing speech path (the "first position"), or so that the speech enhancement processor 20 is coupled to the outgoing speech path (the "second position"). When a reset signal is received by the reset input 16, the delay timer 14 waits for a fixed period of time and then configures the switch 22 to the second position.

A telephone call is initiated for the purposes of the speech processor 15 after the calling party has completed dialing. The switch 22 is initially configured in the first position before the call is initiated. Therefore, initially the outgoing speech signals will only be affected by echo cancellation (and a delay). A reset signal is either sent to the reset input 16 when a call is initiated, or when the called party has answered the call. When the delay timer 14 expires, switch 22 is switched, or "flash-cut," to the second position and the outgoing speech signals are then affected by both echo cancellation and background noise compensation.

The amount of time that the delay timer 14 waits until it expires is set so that the echo cancellation has fully converged and the background noise compensation has fully ramped-up. In one embodiment, if the reset signal is sent to the reset input 16 when the call is initiated, the delay timer 14 is set to expire in approximately 55 seconds; if the reset signal is sent to the reset input 16 when the called party has answered the call, the delay timer 14 is set to expire in approximately 7 seconds.

Figure 1:
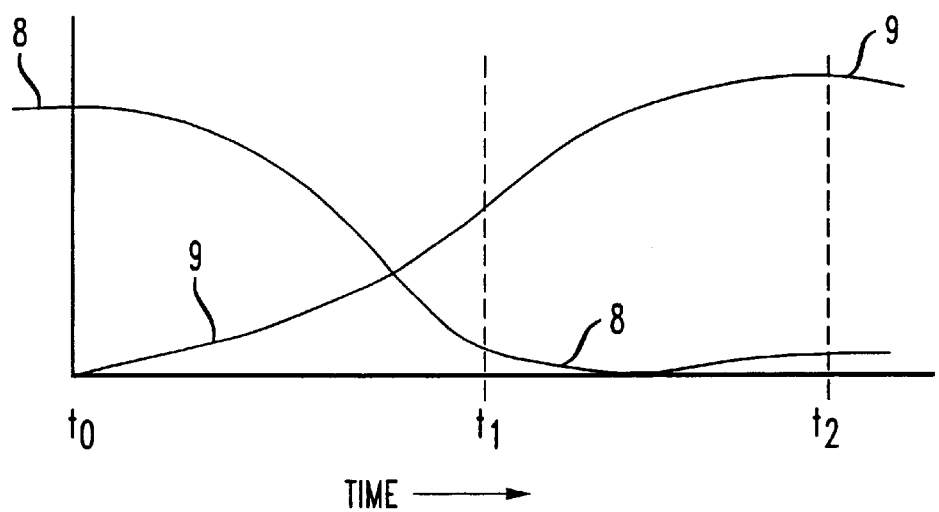
FIG. 1 is a graph illustrating two speech processing features overlapping.

The result is that the quality of the speech signals received by the user increases suddenly when the delay timer 14 expires and the signals are affected by the fully ramped-up background noise compensation. Further, the user is not subjected to degraded speech signals during the period where the two speech processing features overlap, i.e., during time $t_1$–$t_0$ in FIG. 1.

Figure 3:
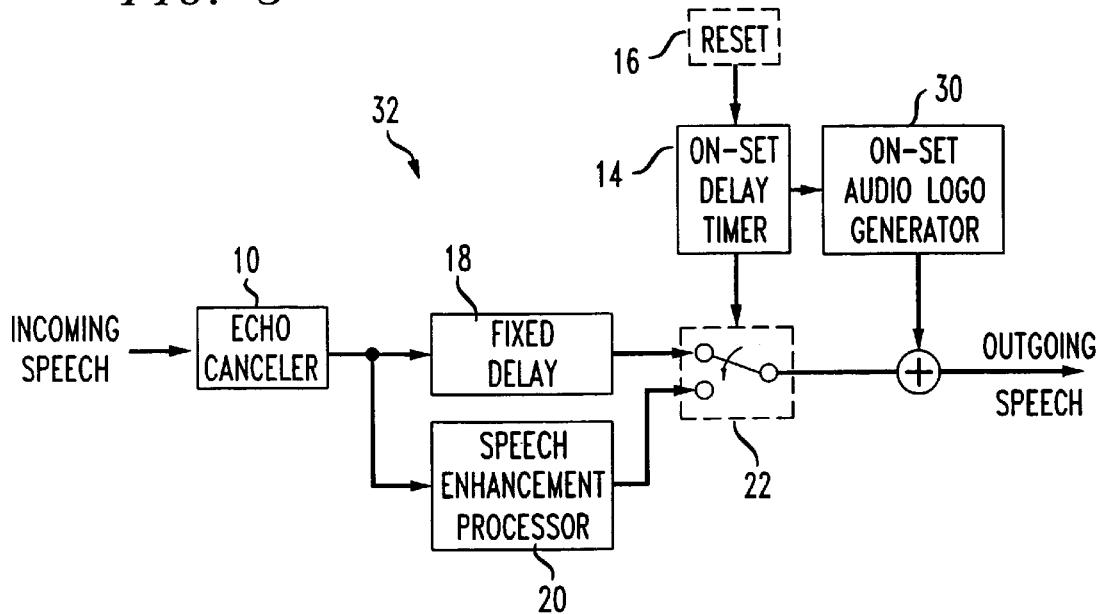
FIG. 3 is a block diagram of another embodiment of the speech processor of the present invention.

FIG. 3 is a block diagram of a speech processor 32 in accordance with another embodiment of the present invention. The speech processor 32 is identical to the speech processor 15 shown in FIG. 2, except the speech processor 32 includes a audio logo generator 30 coupled to the delay timer 14 and the outgoing speech path. The audio logo generator 30, when it is triggered by the expiration of the delay timer 14, generates an audio logo and adds it to the outgoing speech. The audio logo alerts the customer that the telephone call is being flash-cut and the speech signals are now affected by both echo cancellation and background noise compensation. Therefore, the audio logo causes the effect of the background noise compensation to be even more noticeable to the user.

Each component of the present invention has been shown in block diagram form to facilitate clarity of the invention. The functionality of each component can be implemented by conventional equipment that is known to persons of ordinary skill in the art.

Figure 4:
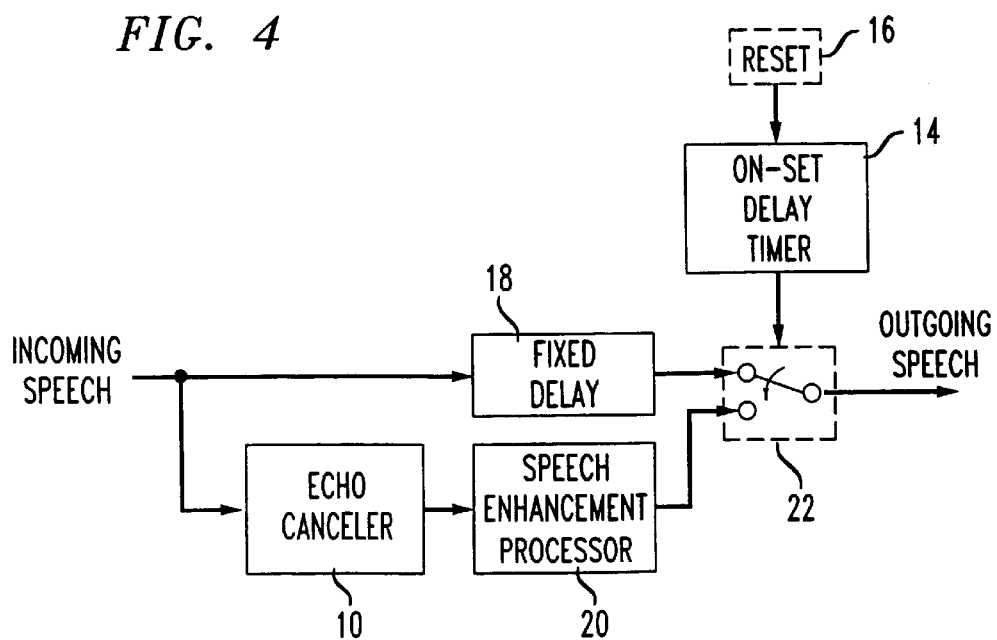
FIG. 4 is a block diagram of another embodiment of the speech processor of the present invention.

In addition, what has been described is merely illustrative of the application of the principles of the present invention. Other arrangements and methods can be implemented by those skilled in the art without departing from the spirit and scope of the present invention. For example, instead of the user initially receiving speech signals affected by echo cancellation, the user can initially receive speech signals unaffected by any speech processing feature. The speech signals affected by both echo cancellation and background noise compensation, and any other speech processing feature, can all be flash-cut onto the speech signals at once. FIG. 4 is a block diagram illustrating an embodiment for this capability wherein speech signal enhancement provided by echo canceler 10 and speech enhancement processor 20 are flash-cut by switch 22 simultaneously under the control of timer 14.

What is claimed is:

1. A method of using a plurality of speech processing features to enhance the quality of a plurality of speech signals received by a user during a telephone call on a telephone network, wherein the network can be switched to either a non-enhanced mode in which the user receives the speech signals not affected by the application of a second speech processing feature, or to an enhanced mode in which the user receives the speech signals affected by the application of the second speech processing feature, comprising the steps of:
    switching the network to the non-enhanced mode;
    initiating the application of a first speech processing feature to the speech signals of the telephone call and initiating the application of the second speech processing feature to the speech signals of the telephone call; and
    switching the network to the enhanced mode at the end of a first duration of time after initiating the application of the second speech processing feature;
        wherein the network is switched to the enhanced mode when interference between the first speech processing feature and the second speech processing feature has substantially ended.

2. The method of claim 1, wherein the network is switched to the enhanced mode at the end of a first duration of time, further comprising the step of:
    delaying the time that the speech signals are received by the user during said first duration of time.

3. The method of claim 2, further comprising the step of:
    sending an audio alert to the user at the end of said first duration of time.

4. The method of claim 1, wherein in the non-enhanced mode the user receives speech signals not affected by the application of the first speech processing feature, and in the enhanced mode the user receives speech signals affected by the application of the first speech processing feature.

5. The method of claim 1, wherein in the non-enhanced mode the user receives speech signals affected by the application of the first speech processing feature, and in the enhanced mode the user receives speech signals affected by the application of the first speech processing feature.

6. The method of claim 1, wherein the first speech processing feature is echo cancellation and the second speech processing feature is background noise compensation.

7. A method of using a plurality of speech processing features to enhance the quality of a plurality of speech signals received by a user during a telephone call on a telephone network, wherein the network can be switched to either a non-enhanced mode in which the user receives the speech signals not affected by the application of a second speech processing feature, or to an enhanced mode in which the user receives the speech signals affected by the application of the second speech processing feature, and wherein said network is in the non-enhanced mode when the call is initiated, comprising the steps of:

applying a first speech processing feature to the speech signals when the telephone call is initiated;

applying the second speech processing feature to the speech signals when the telephone call is initiated; and switching the network to the enhanced mode at the end of a first duration of time after the telephone call is initiated;

wherein the network is switched to the enhanced mode when interference between the first speech processing feature and the second speech processing feature has substantially ended.

8. The method of claim 7, wherein the network is switched to the enhanced mode at the end of a first duration of time, further comprising the step of:

delaying the time that the speech signals are received by the user during said first duration of time.

9. The method of claim 8, further comprising the step of:

sending an audio alert to the user at the end of said first duration of time.

10. The method of claim 7, wherein in the non-enhanced mode the user receives speech signals not affected by the application of the first speech processing feature, and in the enhanced mode the user receives speech signals affected by the application of the first speech processing feature.

11. The method of claim 7, wherein in the non-enhanced mode the user receives speech signals affected by the application of the first speech processing feature, and in the enhanced mode the user receives speech signals affected by the application of the first speech processing feature.

12. The method of claim 7, wherein the first speech processing feature is echo cancellation, and the second speech processing feature is background noise compensation.

13. A speech processor for enhancing the quality of a plurality of speech signals received by a user during a telephone call comprising:

a first speech enhancement processor that applies a first speech processing feature to the speech signals;

a second speech enhancement processor that applies a second speech processing feature to the speech signals; and a switch that switches the speech processor from a non-enhanced mode, in which the user receives the speech signals not affected by the application of the second speech processing the feature, to an enhanced mode, in which the user receives the speech signals affected by the application of the second speech processing feature;

wherein the speech processor is switched to the enhanced mode when interference between the first speech processing feature and the second speech processing feature has substantially ended.

14. The speech processor of claim 13, further comprising:

an audio indicator generator that sends an audio alert to the user.

15. The speech processor of claim 13, wherein in the non-enhanced mode the user receives speech signals not affected by the application of the first speech processing feature, and in the enhanced mode the user receives speech signals affected by the application of the first speech processing feature.

16. The speech processor of claim 13, wherein in the non-enhanced mode the user receives speech signals affected by the application of the first speech processing feature, and in the enhanced mode the user receives speech signals affected by the application of the first speech processing feature.

17. A method of applying a plurality of speech processing features to enhance the quality of a speech signal communicated over a communication network, wherein the speech signals are in an enhanced form by virtue of an application of both first and second speech processing features, the method comprising:

providing a first part of the speech signals to a party in a non-enhanced form; and waiting a period of time after the speech signals is provided to the party in the non-enhanced form and interference between the plurality of speech processing features has substantially ended and, after the period, automatically providing a second part of the speech signals to the party in enhanced form.

18. A method of using a plurality of speech processing features to enhance the quality of a plurality of speech signals received by a user during a voice call on a communications network, wherein the network can be switched to either a non-enhanced mode in which the user receives the speech signals not affected by the application of a second speech processing feature, or to an enhanced mode in which the user receives the speech signals affected by the application of the second speech processing feature, comprising the steps of:

switching the network to the non-enhanced mode;

initiating the application of a first speech processing feature to the speech signals of the voice call and initiating the application of the second speech processing feature to the speech signals of the voice call; and switching the network to the enhanced mode after initiating the application of the second speech processing feature;

wherein the network is switched to the enhanced mode when interference between the first speech processing feature and the second speech processing feature has substantially ended.

19. The method of claim 18, wherein the network is switched to the enhanced mode at the end of a first duration of time, further comprising the step of:

delaying the time that the speech signals are received by the user during said first duration of time.

20. The method of claim 19, further comprising the step of:

sending an audio alert to the user at the end of said first duration of time.

21. The method of claim 18, wherein in the non-enhanced mode the user receives speech signals not affected by the application of the first speech processing feature, and in the enhanced mode the user receives speech signals affected by the application of the first speech processing feature.

22. The method of claim 18, wherein in the non-enhanced mode the user receives speech signals affected by the application of the first speech processing feature, and in the enhanced mode the user receives speech signals affected by the application of the first speech processing feature.

23. The method of claim 18, wherein the first speech processing feature is echo cancellation and the second speech processing feature is background noise compensation.

* * * * *